No. 669,663. Patented Mar. 12, 1901.
A. RIEGEL.
TRANSMITTING AND STEERING MECHANISM FOR MOTOR VEHICLES.
(Application filed Oct. 9, 1900.)
(No Model.)
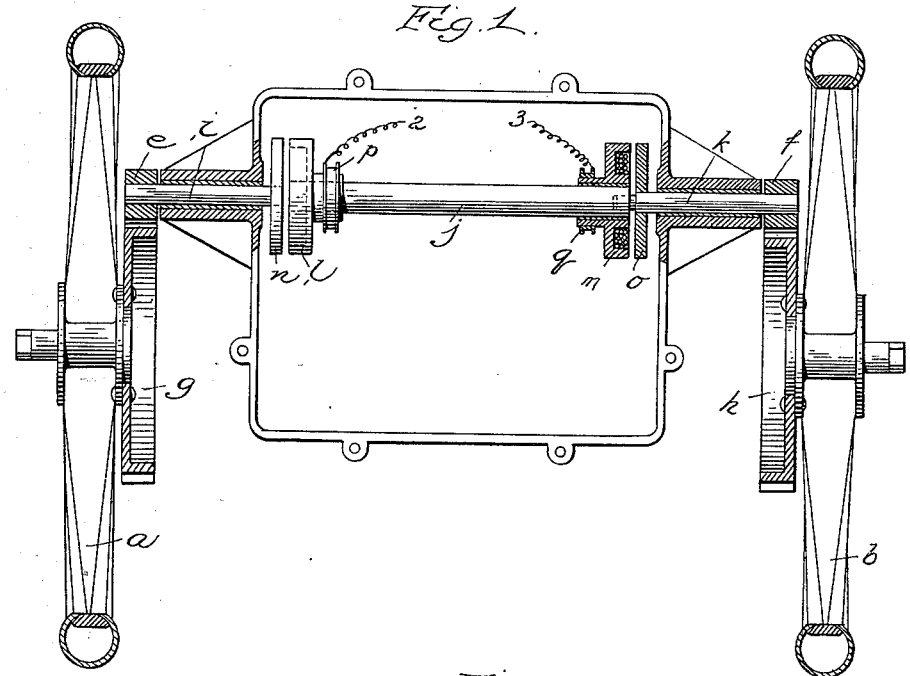
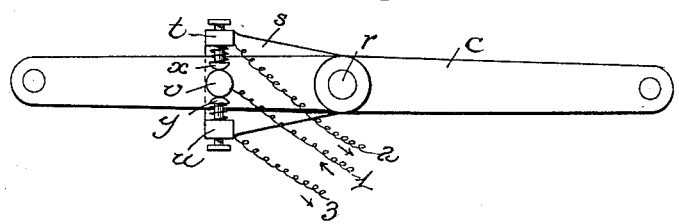

UNITED STATES PATENT OFFICE.

ALFRED RIEGEL, OF PARIS, FRANCE.

TRANSMITTING AND STEERING MECHANISM FOR MOTOR-VEHICLES.

SPECIFICATION forming part of Letters Patent No. 669,663, dated March 12, 1901.

Application filed October 9, 1900. Serial No. 32,536. (No model.)

*To all whom it may concern:*

Be it known that I, ALFRED RIEGEL, engineer, a citizen of the French Republic, residing at 39 Avenue de Breteuil, Paris, France, have invented certain new and useful Improvements in Clutches or Transmitting and Steering Mechanism for Motor-Cars or Automobile Vehicles, of which the following is a full, clear, and exact specification.

In most motor-cars or automobile vehicles the steering is at present operated by a handle-bar or hand-wheel and a turning fore-carriage or broken axles, and in order that the motor-wheels on the same axle may assume different speeds at the moment of turning or change of direction recourse has been had to differential gear. In order to avoid this complicated mechanism, which absorbs a portion of the power of the motor, some builders have adopted a separate motor for each driving-wheel.

Now my invention has for its object to provide a mechanism which while dispensing with the use of differential gear enables motion to be transmitted to the two wheels of the fore-carriage of a vehicle by means of a single motor and leaves the two wheels capable of assuming different speeds at suitable moments—that is to say, on any change in direction or deviation of the fore-carriage relative to the box or body of the vehicle.

The invention will be described with reference to the accompanying drawings, in which—

Figure 1 is an elevation, partly in cross-section, of the two wheels $a$ and $b$ of a vehicle fore-carriage embodying the improvements of my invention; Fig. 2, a plan of the apparatus for interrupting the electrotransmitting mechanism, which is operated, for instance, by a handle-bar $c$.

My invention consists, essentially, in keying on a shaft $i\, j\, k$, parallel to the axle of the wheels, the gearing (for instance, pinions $e\, f$) which by means of toothed rings $g\, h$ drives the vehicle-wheels $a\, b$, which are loosely mounted on their journals. This shaft, which directly and by any suitable means receives the movement of the single motor, is made in three separate parts, the central section $j$ being adapted to be constantly actuated by the single motor and the two end sections $i\, k$ carrying, respectively, the pinions $e$ and $f$ or parts for driving the wheels $a\, b$ and which may, as desired, be either simultaneously or separately firmly connected with or rendered independent of the central part $j$ by means of an electrical clutch-gear.

I will now describe one of the simplest modes of carrying into effect the principle of my invention as just set forth.

Each end of the middle section $j$ of the shaft is provided with a disk $l\, m$ of iron, cast metal, or steel, provided with a circular groove, in which is arranged a coil of electric wire, while the ends of the external sections $i$ and $k$ facing the central section $j$ each carry a plate $n\, o$ of a magnetic metal. The bobbins or coils of wire placed in the grooves of the disks $l\, m$ receive current by circular brush-contacts $p\, q$, connected by wires 2 and 3 through a suitable switch with a source of electricity. It will at once be seen that if current be switched into the coils of the two disks $l$ and $m$ the latter will be converted into electromagnets and will simultaneously attract the plates $n$ and $o$ and render the two outer sections $i$ and $k$ of the shaft simultaneously solid with the central section $j$, and the two wheels $a$ and $b$ will both be actuated for the normal rectilinear travel of the machine. If, on the contrary, the current be switched off one of the coils—for instance, that of the left disk $l$—the plate $n$ will cease to adhere to the disk $l$, the section $i$ will no longer be clutched or bound to the section $j$, and the wheel $a$ becomes loose, the wheel $b$ alone acting as a driving-wheel, which enables a turn to be made with the wheel $b$ on the outside. The reverse effect is of course produced if the current is switched off the disk $k$ instead of the disk $l$. A simple and most practical means for switching or effecting these interruptions and connections of the current in the disks $l$ and $m$ is shown as an example in Fig. 2. $c$ is a plan view of a steering-bar, which by means of a vertical shaft $r$ enables the vehicle to be steered by one of the known methods, (broken axles or turning fore-carriage.) The steering-bar is loosely mounted on the shaft $r$, on which is keyed a piece $s$, provided with two projections or lugs $t$ and $u$. The whole forms a kind of fork, the lugs or prongs $t$ and $u$ of which embrace one of the arms of the steering-bar. A stud $v$ is arranged on the steering-bar between the lugs $t$ and $u$, and this stud is connected to one of the poles of the source of electricity. The wires 2 and 3 (see Fig. 1) are connected, respectively, with the lugs $t$ and $u$, in which slide pins $x$ and $y$ under the control of springs, which keep them in contact with the stud $v$ when the steering-bar is in its normal position. A simple inspection of the figure enables it to be understood that if the driver turns the loosely-mounted handle $c$ in the direction shown by the arrow, for instance, it must first encounter the projection $u$ and break the contact between its stud $v$ and the pin $x$ by pressing in the pin $y$ against its spring-pressure before turning the shaft $r$. Before even a change of direction takes place the current therefore ceases to flow in the wire 2, and the wheel $a$ is rendered free. Per contra, the stud $v$ remains in contact with the pin $y$, the spring of which is simply compressed, and the current continues to pass in the wire 3, and the wheel $b$ remains in action—i. e., the steering one.

I declare that what I claim is—

1. In combination in a clutch, the shaft composed of the sections $i, j, k$, disks $l, m$, arranged at the ends of the section $j$, a coil of wire fitted to the said disks and adapted to produce an electromagnetic action upon the passage of an electric current, and plates $n, o$, of magnetic metal on the shaft-sections $i, k$, arranged opposite the disks $l, m$, substantially as described.

2. A clutch or transmitting and steering mechanism for motor-cars or automobile vehicles, consisting of a shaft $i\ j\ k$ divided into three alined sections, mounted parallel to the axle of the vehicle-wheels, the central section $j$ being adapted to be constantly driven by the motor and having electromagnetic means adapted to clutch or bind it to either or both of the outer sections $i$ and $k$ on which are keyed respectively the parts $e$ and $f$ for driving the vehicle-wheels, substantially as described.

In witness whereof I have hereunto set my hand in presence of two witnesses.

ALFRED RIEGEL.

Witnesses:
LOUIS GARDET,
EDWARD P. MACLEAN.